United States Patent
Zacarias et al.

(10) Patent No.: US 8,589,239 B2
(45) Date of Patent: Nov. 19, 2013

(54) REAL-TIME BIDDING USING INSTANT MESSAGING CLIENTS

(75) Inventors: Arturo Zacarias, Cupertino, CA (US);
Zahid N. Ahmed, San Jose, CA (US);
Senthil K. Pandurangan, San Jose, CA (US)

(73) Assignee: eBay Inc., San Jose, CA (US)

( * ) Notice: Subject to any disclaimer, the term of this patent is extended or adjusted under 35 U.S.C. 154(b) by 2062 days.

(21) Appl. No.: 11/540,769

(22) Filed: Sep. 29, 2006

(65) Prior Publication Data

US 2008/0091550 A1    Apr. 17, 2008

(51) Int. Cl.
*G06Q 30/00* (2012.01)

(52) U.S. Cl.
USPC .............................. 705/26; 705/35

(58) Field of Classification Search
USPC ...................................... 705/37, 26
See application file for complete search history.

(56) References Cited

U.S. PATENT DOCUMENTS

| | | | |
|---|---|---|---|
| 6,732,364 B1 | 5/2004 | Bhaskaran et al. | |
| 6,868,544 B2 | 3/2005 | Dalal et al. | |
| 6,976,005 B1 | 12/2005 | Bansal et al. | |
| 7,054,903 B2 | 5/2006 | Kadyk et al. | |
| 7,058,602 B1 | 6/2006 | La Mura et al. | |
| 2001/0021923 A1* | 9/2001 | Atkinson et al. | 705/37 |
| 2002/0059134 A1 | 5/2002 | Ebbs et al. | |
| 2005/0004985 A1 | 1/2005 | Stochosky | |
| 2005/0027741 A1* | 2/2005 | Eichstaedt et al. | 707/104.1 |
| 2005/0198299 A1 | 9/2005 | Beck et al. | |
| 2006/0112003 A1 | 5/2006 | Levy et al. | |
| 2006/0136325 A1* | 6/2006 | Barry et al. | 705/37 |

FOREIGN PATENT DOCUMENTS

WO    WO-0247320    6/2002

OTHER PUBLICATIONS

Yahoo!Auctions (http://web.archive.org/web/20000620125858/alerts.yahoo.com/config/set_notification?.t=a; http://web.archive.org/web/20000301150038/alerts.yahoo.com/config/set_notification?.t=a).*
"Instant messaging", *Wikipedia*, http://en.wikipedia.org/wiki/Instant_message,(Aug. 1, 2006),4 pages.
"Peer-to-peer", *Wikipedia*, http://en.wikipedia.org/wiki/Peer_to_peer,(Aug. 1, 2006), 7 pages.
Naraine, Ryan , "eBay, InPhonic Roll Out SMS", Internetnews.com, http://www.internetnews.com/ec-news/article.php/1277191,(Jun. 5, 2002),4 pages.
"Developing IM Application and Bots for Business", *Akonix*, http://www.akonix.com/products/literature/Developing%20IM%20Apps%20and%20Bots%20for%20Business.pdf, (2006), 21 Pages.

* cited by examiner

*Primary Examiner* — Charles Kyle
*Assistant Examiner* — Asha Puttaiah
(74) *Attorney, Agent, or Firm* — Schwegman Lundberg & Woessner, P.A.

(57) ABSTRACT

A system and method are provided to implement real-time bidding using instant messaging. In one embodiment, real time messaging may be provided through IM messaging via an IM server over the internet, between a client and a web-based commerce system. The IM server may be provided by various service providers. In another embodiment, real-time messaging between a client and a web-based commerce system may take place over a P2P network provided by a service provider e.g. Skype. The real time messages may include notification messages communicated from the commerce system to a client. A notification message may include an outbid alert message. The real time messages may include re-bid messages communicated from a client to the commerce system.

37 Claims, 12 Drawing Sheets

REAL-TIME BIDDING USING INSTANT MESSAGING CLIENTS

TECHNICAL FIELD

The present application relates generally to the technical field of network-base commerce and, in one specific example, to real-time bidding using instant messaging clients.

BACKGROUND

In typical networked-based commerce systems, a buyer can enter a commerce system's web-site and from the listings published in the web-site, select a desired listing and participate in the bidding process, if the listing is on auction.

Typically, the buyer bids by entering the website and watching the last bid before deciding whether to bid or not. If a decision is made on bidding, or the buyer has already bid on a listing and would like to know if there is any outbid, then the only available channel is the commerce system's website. Buyers also must know if they are the winner whenever the auction is over in order to be able to proceed with other steps such as payment for their desired listing.

Sending messages from the market place to the bidders, e.g. for announcing the end of an auction, is commonly conducted via electronic mail messaging. Currently, real-time messaging has gained a lot of support from several service providers and has become a very popular method of communication. Real-time messaging, also known as instant messaging (IM), uses a client program to hook up to an IM service to provide the client with a IM messaging capability. Most services present features, such as presence information, indicating whether anyone on the contact list of a user is currently online and available for chat.

Presently, several instant messaging services are available on the public internet. The list of most popular ones include, QNEXT®, WINDOWS® Live Messenger, AOL® Instant Messenger, YAHOO® Messenger, GOOGLE® Talk, SKYPE®, .NET® Messenger Service, JABBER®, and ICQ®. Instant messaging increases communication and provides for easier collaboration. On most systems, the user can set an online status or away message to let peers know whether the user is available, busy, or not present at the computer.

Numerous standards for instant messaging have been introduced and used by various providers and several attempts to unify the standards have failed. These standards include, IETF's SIP (Internet Engineering Task Force's Session Initiation Protocol) and SIMPLE (SIP for Instant Messaging and Presence Leveraging Extension), APEX (Application Exchange), and IMPS (Instant Messaging and Presence Service).

While standard instant messaging typically involves an IM server, Peer-to-Peer (or P2P) instant messaging relies primarily on the computing power, storage, and bandwidth of the participating users available on the network. As such, the notion of client-server does not apply to P2P networks. The P2P network systems, having a distributed nature, increase the robustness of the network by replacing centralized servers with a cluster of network nodes (computers). The connections between nodes in a P2P network are typically ad hoc connections.

Many P2P networks using overlay protocol are examples of overlay networks. Overlay networks are computer networks built on the top of the internet; the construction of which allow routing of messages to the destinations not specified by IP (Internet Protocol) addresses. Based on how the nodes in an overlay network are linked to each other, one can classify the P2P networks as unstructured or structured. If the overlay links are arbitrarily established, then the network is unstructured. Most popular P2P networks such as NAPSTER®, GNUTELLA®, KAZAA®, and SKYPE® are unstructured.

Structured P2P networks on the other hand maintain a Distributed Hash Table (DHT) and allow for each peer to be responsible for a specific part of the content on the network. Some well known structured P2P networks are: CHORD®, PASTRY®, TAPESTRY®, CAN®, and TULIP®.

Real time communication between a network-based commerce system and its clients is a challenge in existing systems For example, the sending of alert notifications and the receiving of client responses to the communicated alert notifications is an example of the challenges that many electronic commerce systems face today.

BRIEF DESCRIPTION OF THE DRAWINGS

Some embodiments are illustrated by way of example and not limitation in the figures of the accompanying drawings in which.

DETAILED DESCRIPTION

Example methods and systems to provide real-time bidding using instant messaging clients are described. In the following description, for purposes of explanation, numerous specific details are set forth in order to provide a thorough understanding of example embodiments. It will be evident, however, to one of ordinary skill in the art that the present invention may be practiced without these specific details.

Figure 1:
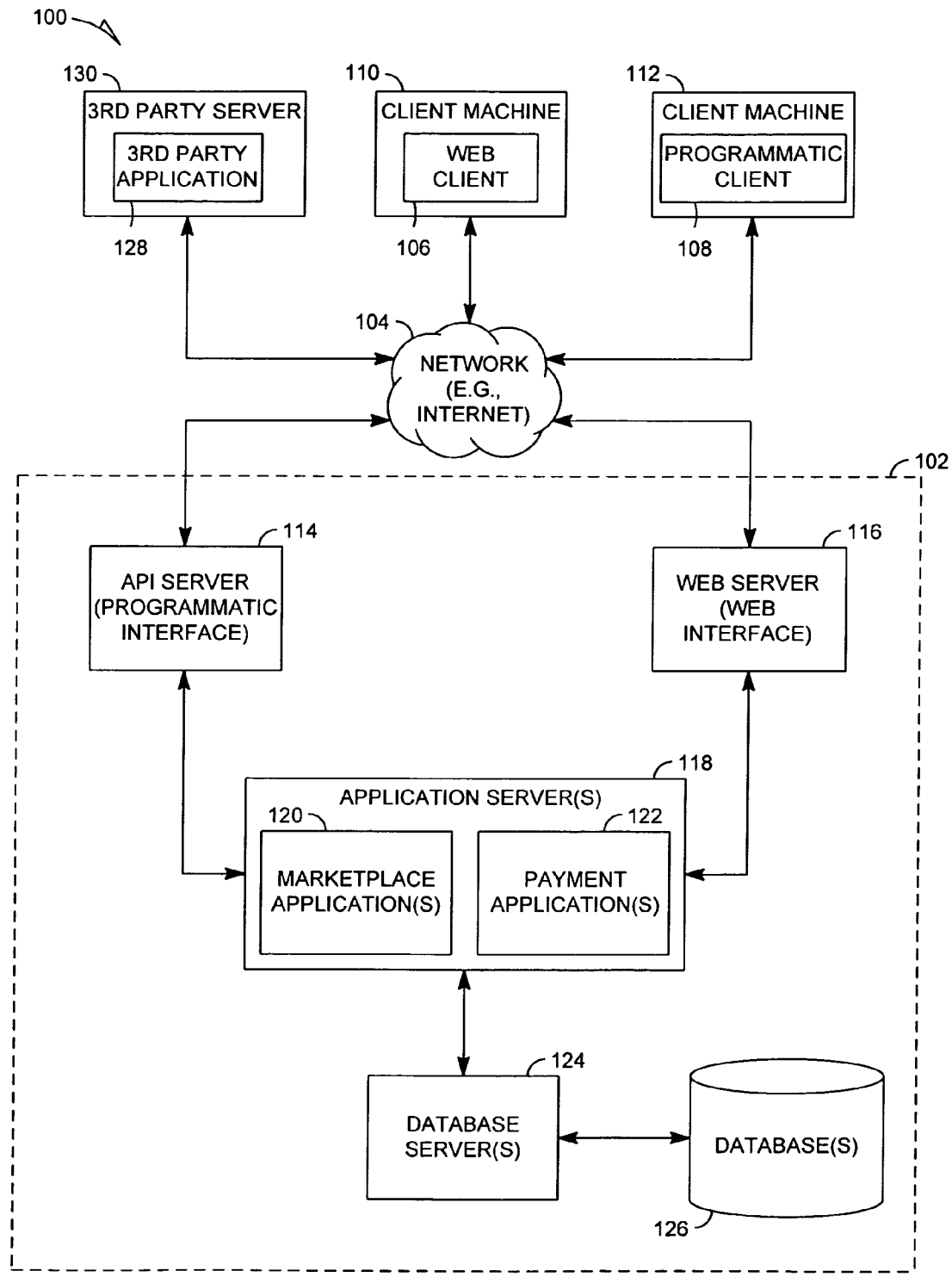
FIG. 1 is a network diagram depicting a client-server system.

Referring to the drawings, FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the INTERNET EXPLORER® browser developed by MICROSOFT® Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application server(s) 118 host one or more marketplace applications 120 and payment applications 122. The application server(s) 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace application(s) 120 and payment application(s) 122 could also be implemented as standalone software programs, which do not necessarily have networking capabilities.

The web client 106 accesses the various marketplace application(s) 120 and payment application(s) 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by EBAY® Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
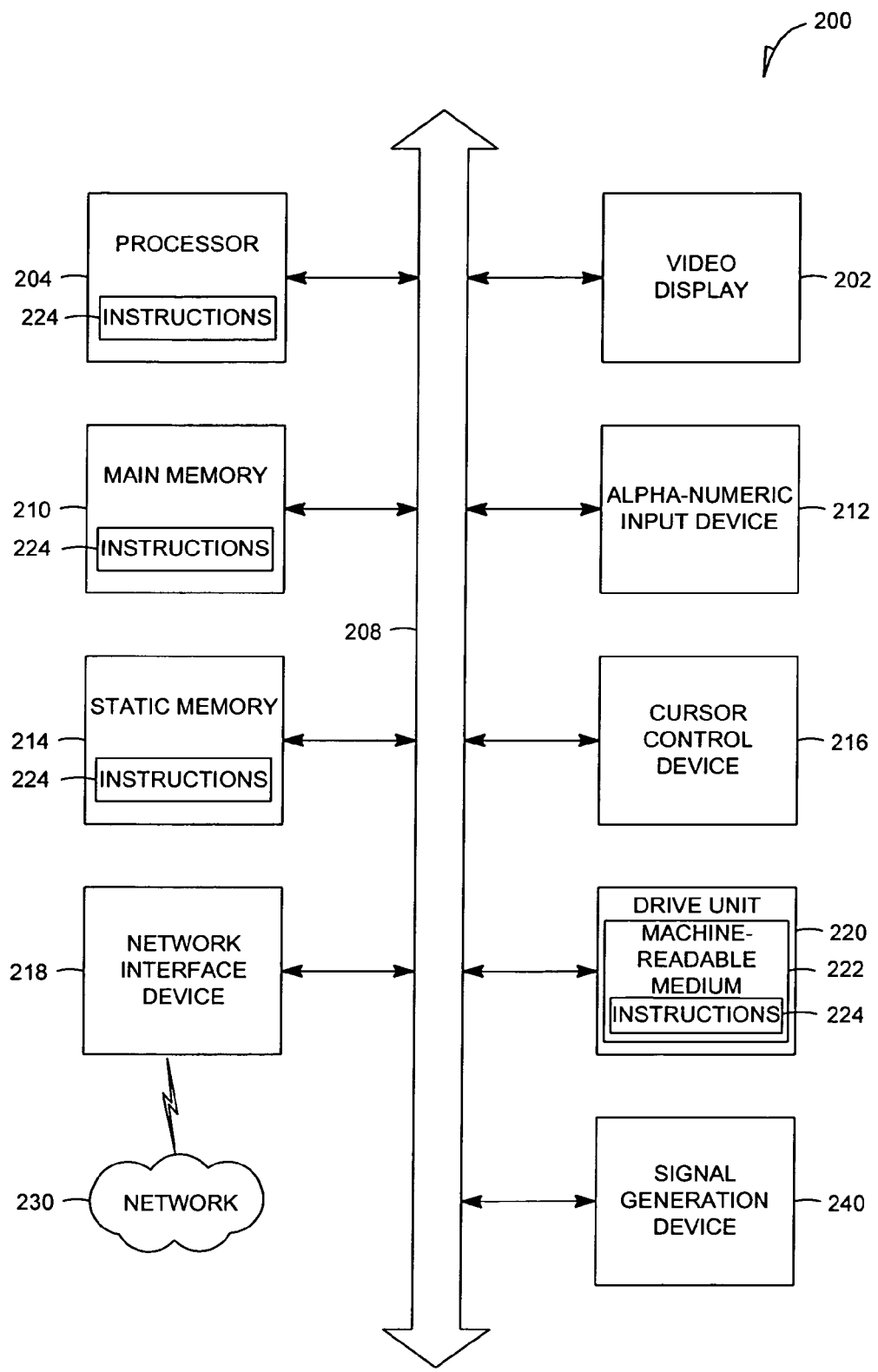
FIG. 2 is a diagram representing a machine in the example form of a computer system.

FIG. 2 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 204 (e.g., a central processing unit (CPU) a graphics processing unit (GPU) or both), a main memory 210 and a static memory 214, which communicate with each other via a bus 208. The computer system 200 may further include a video display unit 202 (e.g., a liquid crystal display (LCD) or a cathode ray tube (CRT)). The computer system 200 also includes an alphanumeric input device 212 (e.g., a keyboard), a cursor control device 216 (e.g., a mouse), a disk drive unit 220, a signal generation device 240 (e.g., a speaker) and a network interface device 218.

The disk drive unit 220 includes a machine-readable medium 222 on which is stored one or more sets of instructions (e.g., software 224) embodying any one or more of the methodologies or functions described herein. The software 224 may also reside, completely or at least partially, within the main memory 210 and/or within the processor 204 during execution thereof by the computer system 200, the main memory 210 and the processor 204 also constituting machine-readable media.

The software 224 may further be transmitted or received over a network 230 via the network interface device 218.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Figure 3:
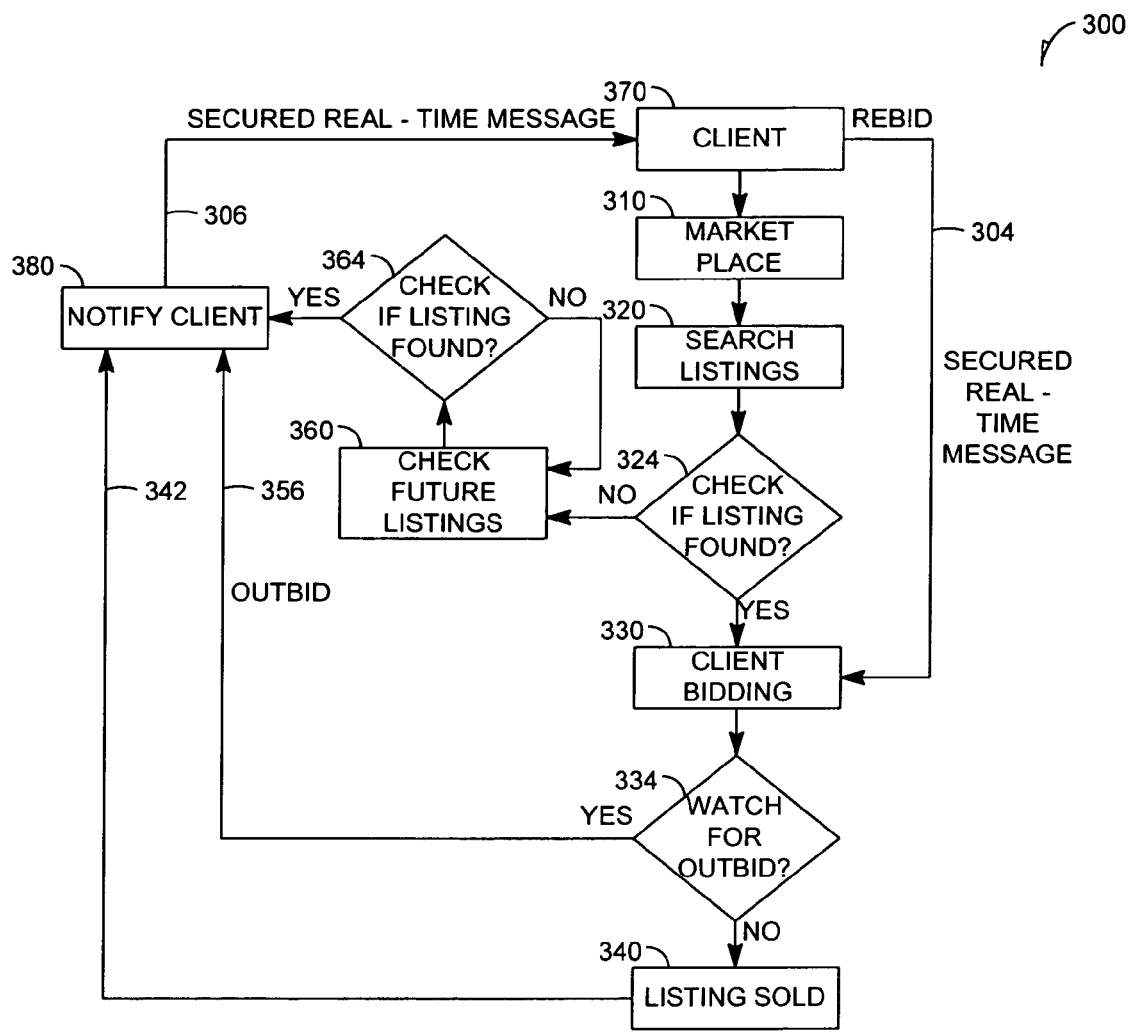
FIG. 3 is a flow diagram showing, an example client-commerce system interaction.

FIG. 3 is a flow diagram 300 showing, in an example embodiment, a client-commerce system interaction. In diagram 300, an example overall process flow involved in searching listings on a market place environment and bidding for a desired listing in that system is illustrated. Also, various situations in which the commerce system needs to send alert messages to the client are emphasized. Real time messaging of outbid alerts 306 and re-bid actions 304 are example methods covered by various embodiments and will be discussed in more details later in the present application.

The client 370 may interact with the marketplace 310 from a client machine either as a programmatic client 108 or web client 106 via the network 104 (see FIG. 1). If for example the client is using web browser to connect to the marketplace website, then the web server 106 may be deployed to connect the client to an application server(s) 118. On the other hand, the connection to application server(s) 118 may be provided by the API server 114. There are several instances that the client may use an application on the client machine 112 to exchange information with the commerce system. The client may want to add a new listing or send message(s), e.g. a re-bid message, to the commerce system, or receive a message(s) sent by the marketplace.

In the marketplace, the client may look for a specific listing by performing the search listings step 320. If the search performed in step 320 is not successful and the desired listing is not found, the control operation 324 passes control to operation 360 where future listings are checked. Otherwise, if the search performed in step 320 is successful and the listing is found, step 330 is initiated where the client may participate in the bidding process. In operation 360 where future listings are checked, the client's requested listing may be compared with future listings at the market place. If the result of this comparison is negative, the control 364 passes control back to step 360 where future listings are checked. Whenever the search ends up with the listing found, operation 380 is performed to notify the client. As a result of operation 380, the client may be informed via a secured real-time message 306 (through a process described in detail below), that the client's requested listing is found. The client 370 may then participate in bidding for the desired listing via marketplace 310.

Referring still to FIG. 3, the client's bidding process 330 is followed by step 334 where a watch for an outbid is performed. If there is an outbid on the client's requested listing, the notify client operation 380 may be invoked and the client may be notified, via a secure real-time message 306 (through a process described in detail below), that an outbid exists. If there are no outbids and the client is the actual winner of the auction for the listing, then step 340 is performed to close the auction and complete the sale of the listed item. Additionally, step 380 is performed to notify the client via a secure real time message 306 that he or she is the winner of the auction. The real time notification message may include instructions for the client describing the steps the client has to take in order to proceed with the purchase process.

If the client 370 is notified by a notify client operation 380, via a secure real time message 306 of an outbid, the client may choose to submit a higher bid by sending a re-bid instant message to the marketplace environment, which would initiate the bidding process 230.

Figure 4:
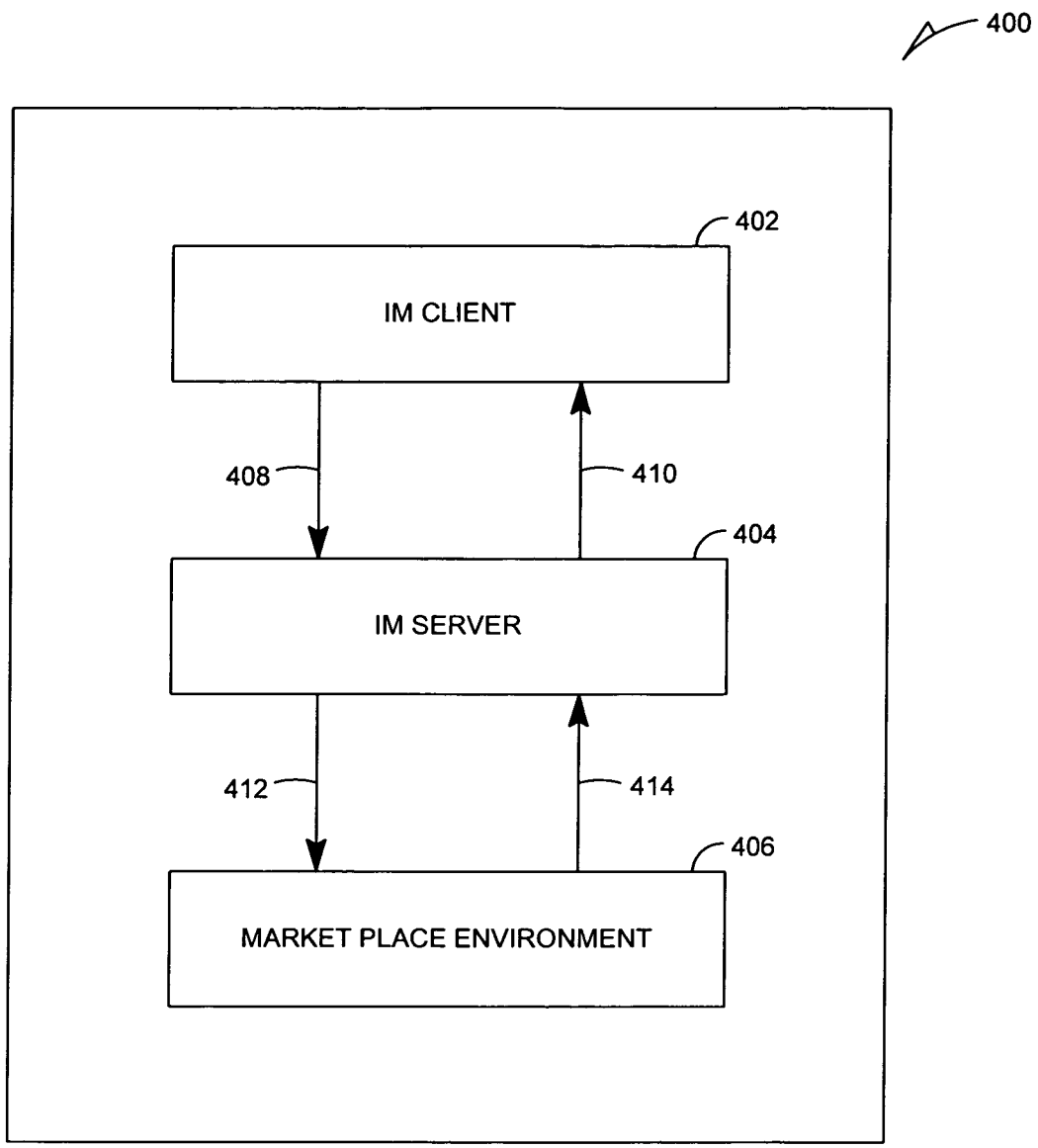
FIG. 4 is a diagram showing, an example high level instant messaging process flow between an IM client and a marketplace.

Referring to FIG. 4, diagram 400 shows, according to an example embodiment, a high level instant messaging process flow between an IM client 402 and a marketplace 406. In the example embodiment shown in this figure, the client marketplace messaging may be conducted via an intermediary server presented in FIG. 4 as IM server 404. The IM client 402 may be an application running on an IM client machine 112 (FIG. 1) and providing real time messaging between IM client 402 and marketplace 406 via IM server 404. In an example embodiment, the IM server 404 may be any commercial service provider such as, but not limited to, YAHOO®, AOL®, and MSN®. The IM server 404, in an example embodiment, may receive one or more messages 408 via network 104 (e.g. internet). The IM server 404, after some processing described below, may forward the processed message(s) 412, via network 104 (e.g. internet), to the marketplace environment 406. In an example embodiment, transmitted data 408 and 412 may be re-bid message(s) sent by IM client 402 to the marketplace environment 406. In an example embodiment, the message(s) 408 may preferably be communicated over a secured channel, whereas the message(s) 412 is always communicated over a secured link using, for example, HTTP (Hyper Text Transfer Protocol) protocol.

The IM server 404, in an example embodiment, may receive one or more messages 414, via network 104 (e.g. internet), from the marketplace environment 406, and after some processing described below, forward the processed message(s) 410, via network 104 (e.g. internet), to IM client 402. In some example embodiments, transmitted data 410 and 414 may be outbid alert messages submitted by the marketplace environment 406 to the IM client 402. In some example embodiments, message(s) 414 may be communicated over a secured channel using HTTP protocol, whereas message(s) 410 may be communicated over an unsecured channel.

Figure 5:
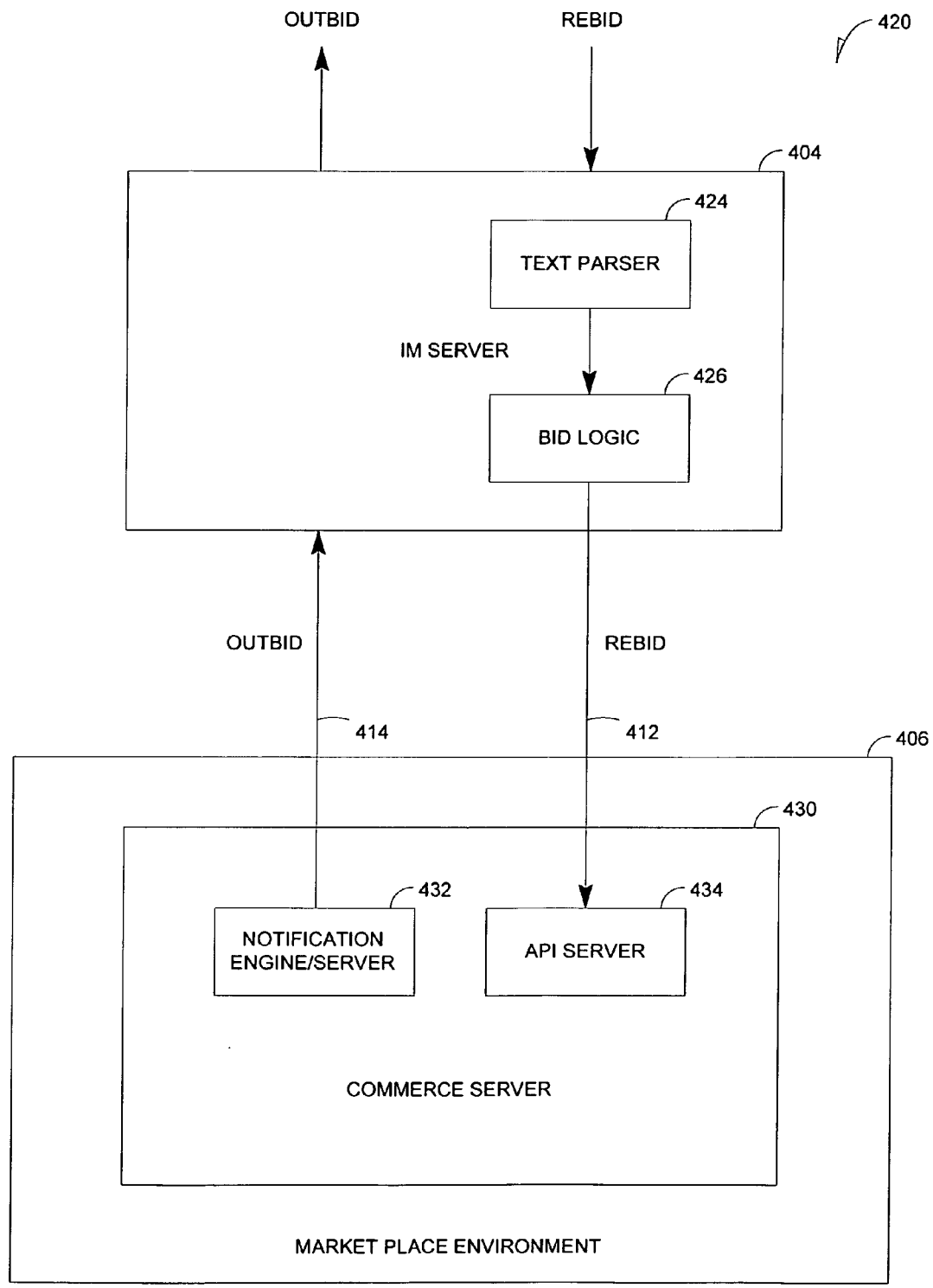
FIG. 5 is a diagram describing an example IM server and a marketplace environment.

FIG. 5 is a diagram 420, according to an example embodiment, describing in more detail the IM server 404 and the marketplace environment 406. In an example embodiment the IM server 404 may include one or more text parser modules 424 and one or more bid logic modules 426. Because instant messages communicated from the IM client application 402 to IM server 404, including re-bid messages, may comprise text messages, a text parser module 424 may be provided by IM server to parse the text messages received from IM client 402 into their components and convert the components to a data format readable by the bid logic module 426. The bid logic module 426 may receive the parsed text messages from the text parser 424 and, based on the content of message, determine for example the identity of the bidder, the listing corresponding to the new bid, and the amount of the new bid. The bid logic module 426 then may, for example, prepare an encoded form of the information derived from the re-bid message 410 to be sent, via a network 402 (e.g. internet), in the form of message(s) 412, to a marketplace environment 406. The bid logic may also operate in a message validation role, e.g. to determine if the format of the re-bid message communicated by the IM client is correct. In an example embodiment, the re-bid module may be an application running on the IM server, which may be provided to the market place environment.

According to an example embodiment, the commerce server 430 included in the marketplace environment 406 may be responsible for handling IM messages 412 and 414. In some example embodiments, the commerce system 430 may include one or more notification engine/servers (NE) 432 and one or more API server(s) 434. In an example embodiment, the notification engine may be responsible for providing one or more output alert messages 414 whenever the notify client operation is invoked by a yes output 356 of the decision step 324 (see FIG. 3). In the example system of FIG. 5, the notification engine 432 may provide one or more output messages 414 and communicate the message via a network 104 to IM server 404. In the example system of FIG. 5, the output messages 414 communicated to the IM server 404 are forwarded via network 102 to the IM client 402. In an example embodiment, the real time messaging between the IN client and the marketplace environment may take place via a P2P network e.g. Skype.

Figure 6:
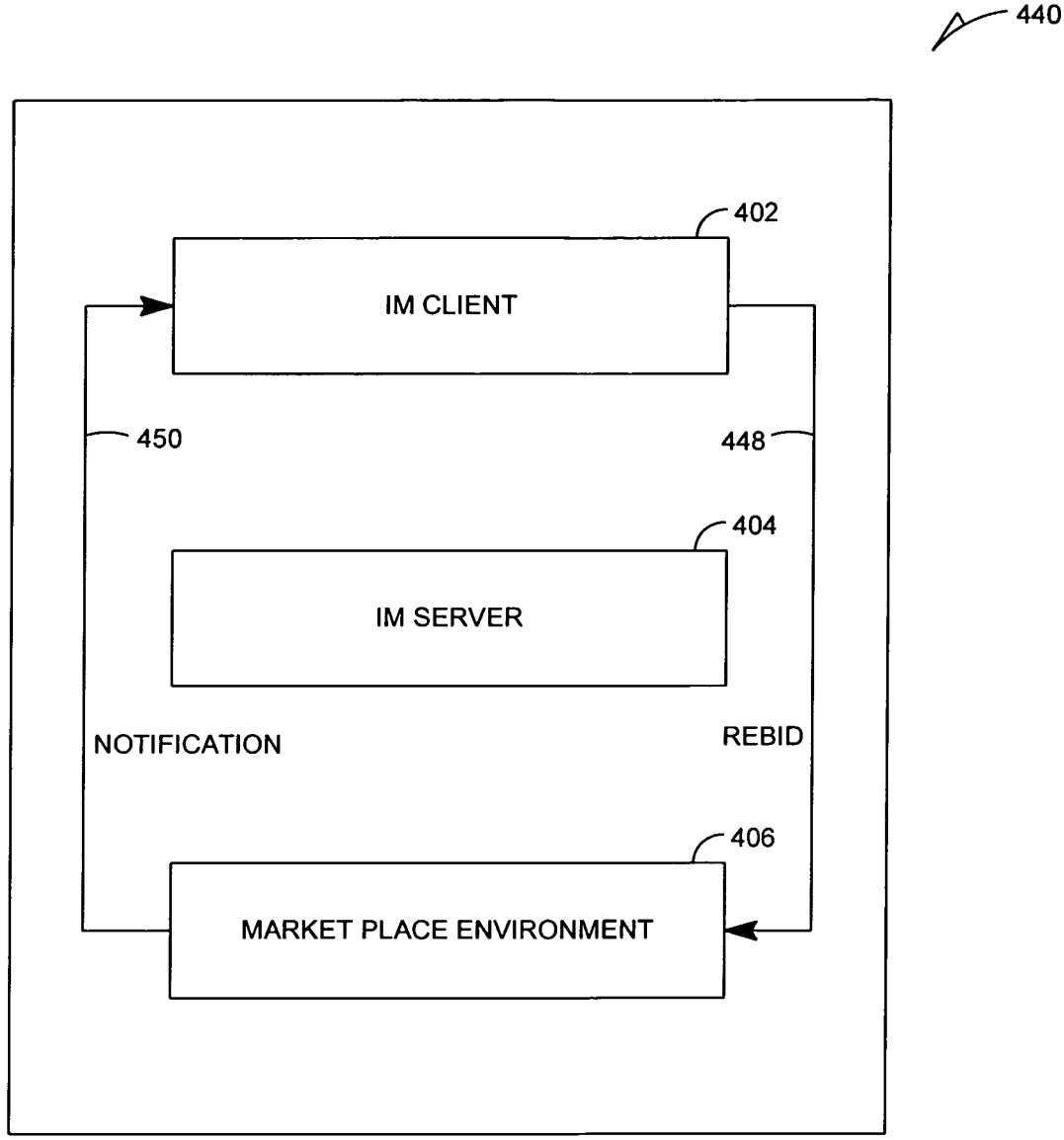
FIG. 6 is a diagram depicting in a high level an example embodiment of a P2P instant messaging system.

As described above, IM messaging can take place in a more distributed way by peer-to-peer (P2P) messaging. In an effort to compare P2P IM messaging to IM client-server messaging, diagram 440 in FIG. 6 is used to depict an example embodiment of a P2P instant messaging system, where the role of the IM server is eliminated. As seen from the diagram, the real time messaging between the IM client 402 (later introduced as P2P client 462) and marketplace environment 406 may be conducted in a more direct fashion without the need for any IM server. In a P2P network, typically the primary reliance is on computing power and bandwidth of the computers participating in the network (not shown in the FIG. 6) rather than a few servers.

Figure 7:
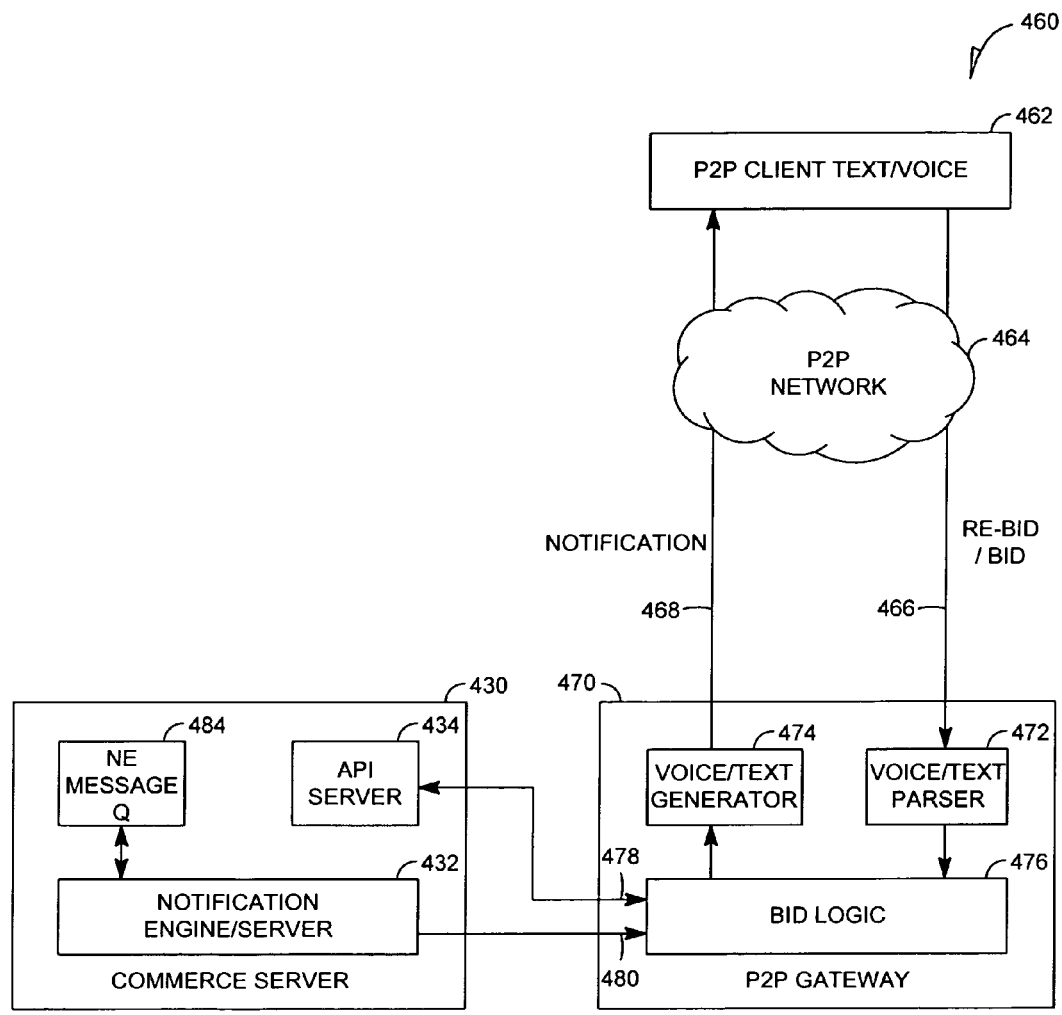
FIG. 7 is a diagram showing an architecture of an example P2P instant messaging system.

FIG. 7, diagram 460, according to an example embodiment, shows a high level architecture of a P2P instant messaging system 460 between a P2P client 462 and a commerce server 430. The P2P instant messaging system 460, as an example embodiment, includes one or more P2P clients 462, a P2P network 464, one or more P2P gateways 470, and one or more commerce servers 430. The commerce server 430 is in fact a subsystem of the marketplace environment 406 of FIG. 5.

As an example embodiment, a P2P client 462 may receive notification messages from a P2P gateway, in either text or voice forms. The P2P client may also send re-bid/bid messages in the form of either a text or voice after being notified by a notification message from the commerce server 430, if the notification relates to an outbid. A notification message 468 communicated by P2P gateway 470 may pass through a cluster of nodes depicted as P2P network 464 before reaching the P2P client 462. The P2P network 464 also provides a link between the P2P client and the P2P gateway 470. According to an example embodiment, the P2P network may be Skype P2P network.

The P2P gateway 470 may, in an example embodiment, handle at least the processing and communicating of the notification and re-bid/bid messages between the commerce server 430 and the P2P network 464. According to an example embodiment, the P2P gateway may be a Skype gateway. The P2P gateway 470, in an example embodiment, may include one or more voice/text parser modules, one or more voice/text generator modules, and one or more bid logic modules.

As shown in FIG. 7, the bid logic module 476 may communicate with the commerce server 430 via voice/text generator 474 and/or via voice/text server 472. The bid logic module 476 may receive the parsed text messages from the text parser 472 and, based on the content of message, determine for example the identity of the bidder, the listing corresponding to the new bid, and the amount of the new bid. The bid logic module 476 then may, for example, prepare an encoded form of the information derived from the re-bid/bid message 466 to be sent, via a network 402 (e.g. internet), in the form of message(s) 478, to the commerce server 430. The bid logic may also operate in a message validation role, e.g. to determine if the format of the re-bid/bid message communicated by the P2P client is correct. In an example embodiment, the bid logic module may be an application running on the P2P gateway. In an alternative embodiment, the API server 434 may be linked to the voice/text generator module of the P2P gateway. In this role the bid logic module 474, may validate messages from the API server 434, and return appropriate error messages to the API server 434 in order for the server to try to correct the error.

The voice text generator 474 may receive an notification signal from the bid logic module 476 and convert the notification signal to specialized format text/voice notification messages 468. The notification messages 468 are then communicated, via the P2P network 464, to the P2P client 462. In one example embodiment the notification may relate to an outbid on a user's desired listing. An example outbid message 468 may include information on listing ID, the client output price, and/or a time stamp.

In an alternative example embodiment, the notification may be issued as a result of detection of a new bid on a user's watched listing. In that case, the notification may inquire if the user wants to bid on that listing. If the user may decide to respond by sending a real time bid for that listing to the commerce server. The voice/text parser module 472 may receive re-bid/bid messages in a specialized format voice/text format from the IM client 462 and parse the messages into their components including listing ID, re-bid/bid price, client ID, and a time stamp and communicate the components to the bid logic module 476.

According to an example embodiment, the commerce server may include one or more notification engines/server or servers 432, one or more API server(s) 434, and a message queue module (NE Message Q) 484. An example notification engine server 432 may be responsible for providing one or more alert messages 480 whenever the market place environment detects an outbid for the P2P client's desired listing, or a new bid on a user's watched listing. In an example embodiment, the notification engine/server 432 communicates notification messages over HTTP protocol to the P2P gateway 470. An example API server 432 may handle re-bid/bid messages, processed and sent by bid logic module 476. The NE message queue module 484 may be responsible, for queuing notification messages issued by the notification engine/server 432.

Figure 8:
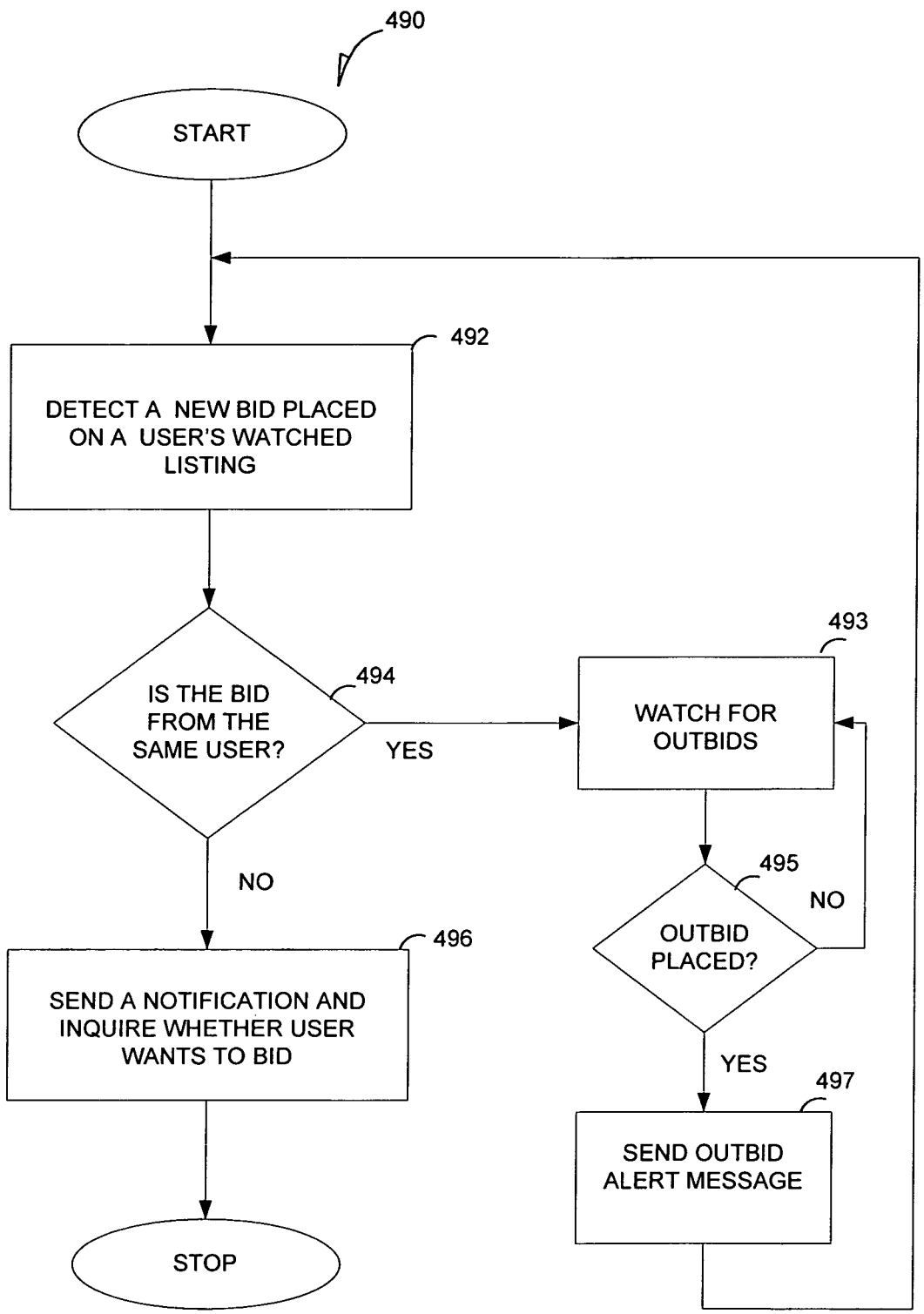
FIG. 8 is a flow chart, according to an example embodiment, illustrating the process of detecting a bid on a listing watched by a user and notifying the user of the bid on that listing.

FIG. 8 is a flow chart 490, according to an example embodiment, illustrating the process of detecting a bid on a listing watched by a user and notifying the user of the bid on that listing. Typically users may add a listing to their watched list by entering the page for that listing, in the website, and designate that listing as watched listing. Once the listing is added to the user's watched list, the commerce server 430 (see FIG. 7), in operation 492 may, upon such bidding by another user, detect the bid placed on the listing currently being watched by the user. In the following operation 494, the commerce server 430 may detect the identity of the bidder. In case the bid is from another user, in operation 496, the commerce server 430 may send a notification alert message 468, notifying the user of the placed bid. The commerce server 430 may also inquire, in operation 496, whether the user is willing to place a bid on that listing. In case operation 495 detects that the bidder is the same user, it may start operation 493, in which the commerce server 430 watches for outbids, and if operation 495 detects an outbid by another user, operation 497 starts by sending an outbid alert message followed by handing the control to operation 492.

Figure 9:
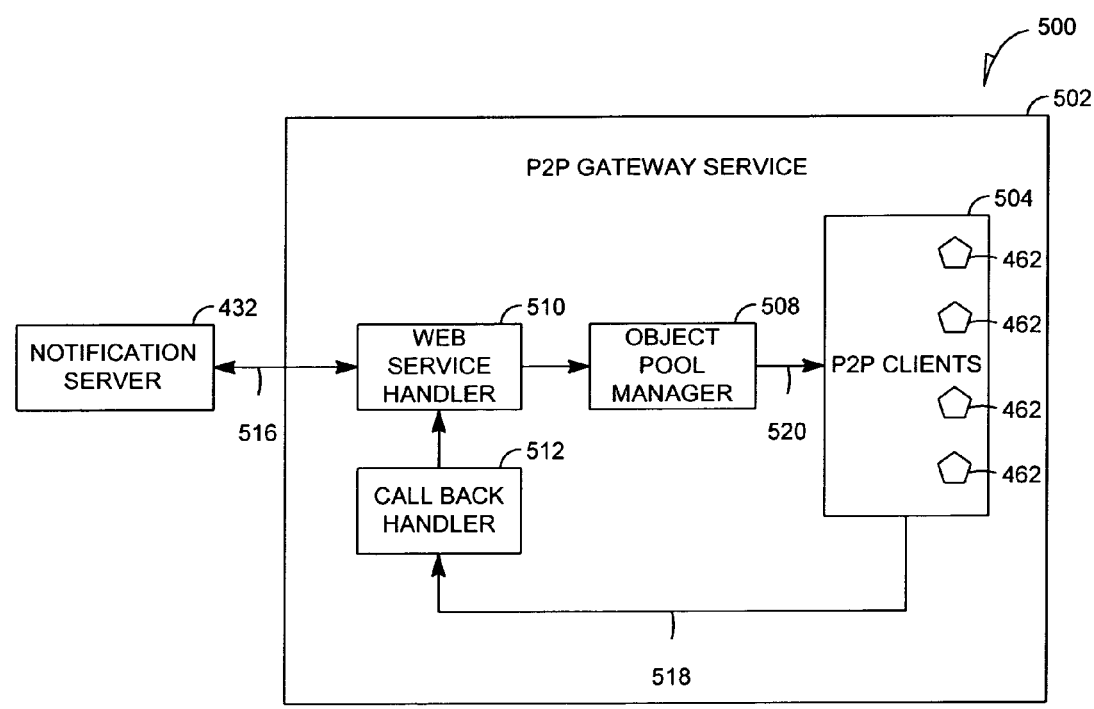
FIG. 9 is a diagram representing functional view of an example P2P gateway.

FIG. 9 is a diagram 500, as an example embodiment, shows functional view of P2P gateway, in which a P2P gateway service 502 may comprise of one or more web service handler 510, one or more object pool manager 508, a pool 504 of a plurality of the P2P clients 462, and one or more callback handler module 512. The P2P gateway service 502 is an example of functional modules that handle communication between notification server 432 of the commerce server 430, on one hand and the P2P client 462 on the other hand.

The web service handler 510 may be an application that handles HTTP communication between the notification engine 432 and the P2P gateway 470. In order for the P2P gateway 470 to be able to service multiple notification messages from the notification engine 432, P2P gateway 470 may use an object pool manager 508, which basically may act as a pool of connections to allow the P2P gateway 470 to receive, concurrently, multiple notification messages directed to different clients. Once the object pool manager receives those notification messages, the object pool manager may hand them off to the P2P network provided C++ client application on the client machine 112 (see FIG. 1). In one embodiment, the programmatic IM client is a C++ client library may be embedded inside the P2P gateway (e.g. Skype gateway) and interfaces with the object pool manager. Once the programmatic IM client receives the notification message from the object pool manager, then the programmatic IM client transmits the notification message over a secure P2P network to the target P2P clients 504. The call back hander 512 may play the role of correlating any re-bid/bid message received by the gateway 470 with a corresponding notification message sent out to the P2P network.

Figure 10:
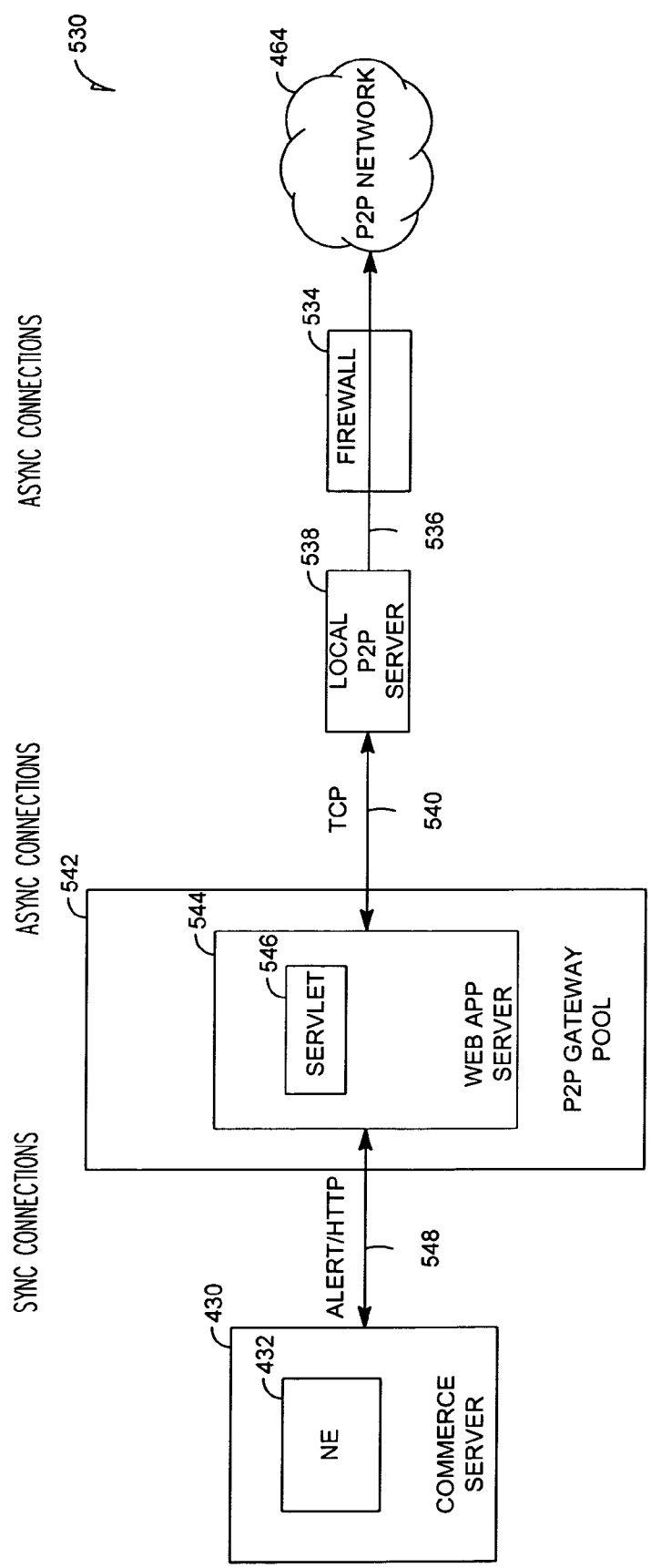
FIG. 10 is a diagram showing a P2P instant messaging system revealing, link protocols within various subsystems or modules.

With reference to FIG. 10, diagram 530 shows an example embodiment of a P2P instant messaging system revealing link protocols within various subsystems or modules. In an example embodiment, a P2P instant messaging system uses the Skype network. Module 432 represents a notification engine/server module of the commerce server 430. According to one example embodiment, the notification engine 432 is communicatively coupled to web application server 544 in a P2P gateway 542. The web application server 544 hosts the servers running on it. It may include a Servlet 546. The function of Servlet 546 is to receive messages communicated synchronously over HTTP protocol via the notification engine 432.

In the example embodiment shown, a local P2P server 538 may handle connection between the web application server 544 and the P2P network 464. In the example embodiment shown, the asynchronous link 536 between the local P2P server 538 and the P2P network 464 is secured by a firewall 534. The firewall 534 limits access between the local P2P server 538 and the P2P network 464 based on defined security policies, and protects the resources of the server from P2P network users, e.g. by blocking all incoming traffic to local P2P server 538, to prevent security attacks and impact availability of the P2P server 538. In an example embodiment, the link 540 between the web application and the local P2P servers 538 may be an asynchronous connection governed by TCP (Transmission Control Protocol).

Figure 11:
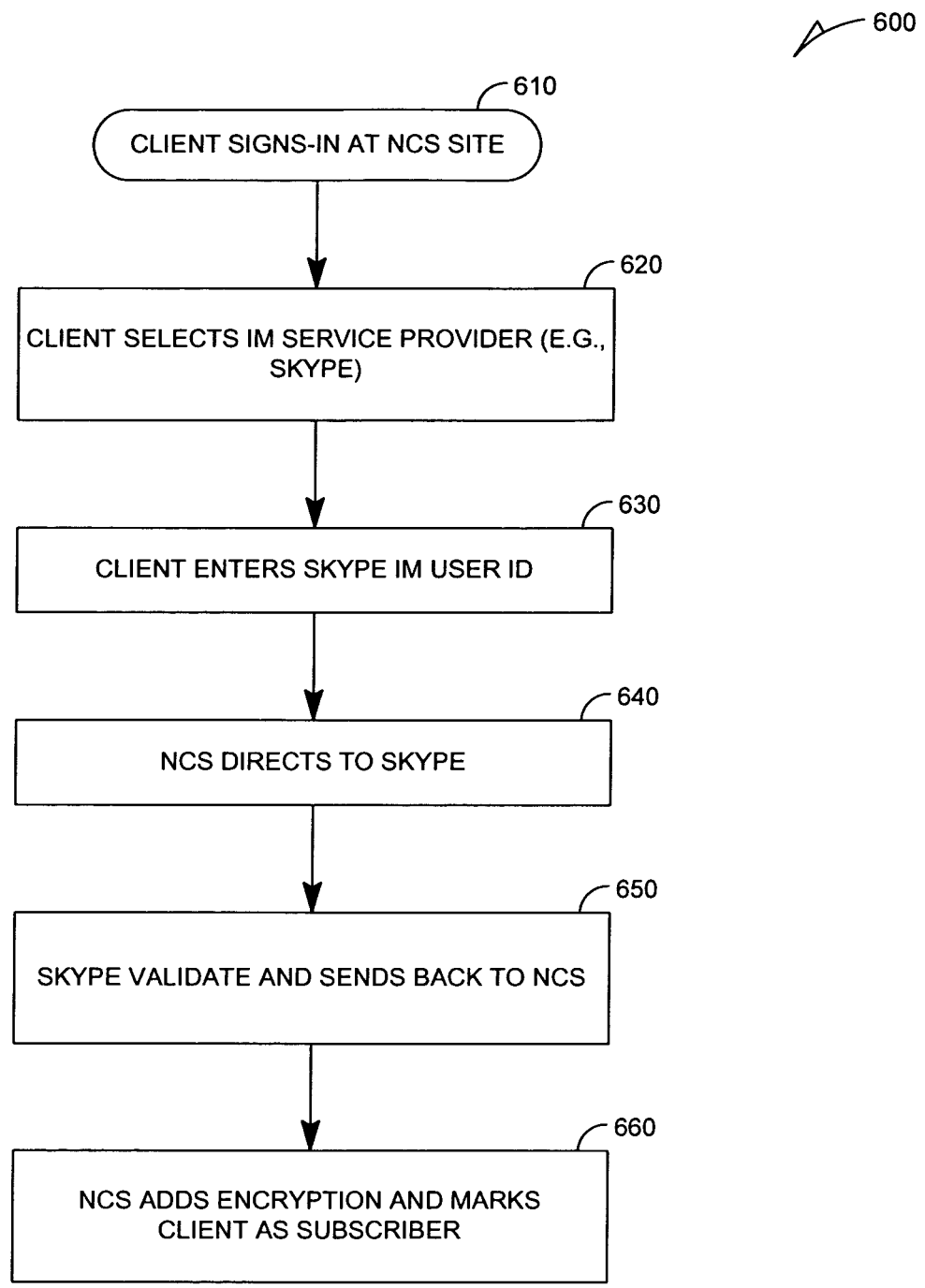
FIG. 11 is a flow chart illustrating an example client subscription process, in a network-based commerce system, for a P2P instant messaging service (e.g. Skype)

FIG. 11 is a flow chart 600, according to an example embodiment, illustrating the client subscription process for a SKYPE® instant messaging service in a network-based commerce system 102 of FIG. 1 (shown as NCS). The process may start with operation 610 wherein the client may sign in at the network-based commerce system's site as a web client 106 from a client machine 110 (see FIG. 1). In the next step (620), the client may select the instant messaging service provider, e.g. SKYPE®, from a list provided by the network-based commerce system 102. The Client then may initiate step 630 by entering the service provider ID (e.g. a SKYPE® ID) and pressing submit. In the following step 640, the network based commerce system 102 may direct the client to the service provider, e.g. SKYPE®, and may make the client sign in at the service provider. The next step 650 is a validating step. Validating step 650 may direct the client back to the network-based commerce system 102 indicating whether sign in was successful. In the next step (660), the network-based commerce system 102 may include, in the redirection URL, an encrypted partner ID assigned by the service provider (e.g. a SKYPE®) to the network-based commerce system and mark the user as subscribed on an appropriate table, e.g. a notification preference table.

Figure 12:
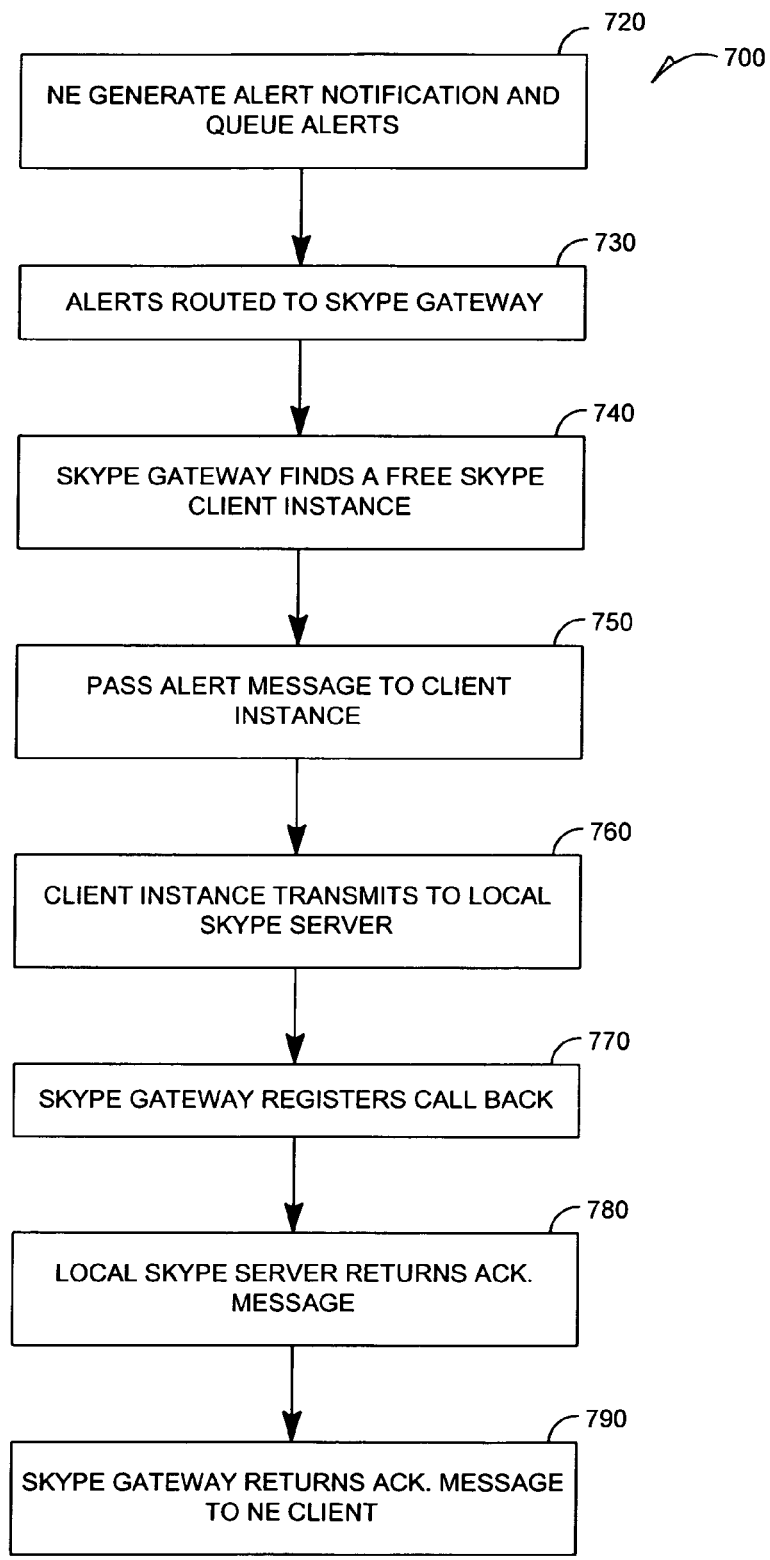
FIG. 12 is a flow chart showing an example high level flow of transmitting IM alert messages over a P2P network.

FIG. 12 is diagram 700, as an example embodiment showing a high level flow of a method for transmitting IM alert messages over a P2P network, e.g. SKYPE®. In a step 720, an alert notification (outbid, watched items) is generated by notification engine 432 (NE). The notification engine 432 queues the alert messages in an NE message queue 484. In a step 730, alert messages are routed to the P2P gateway 470 (e.g. SKYPE® gateway) as a web application via a synchronous internal API call. The service provider, e.g. SKYPE® in step 740 determines which client instance 462 is free (e.g. not blocked) from a connection pool of client instances 504. In a step 750, the service provider, may pass the alert messages via in process JNI (Java Native Interface)API invocation to a free client instance 462. Client instance 462 in a step 760 transmits the alert messages to local P2P server 538 (e.g. a SKYPE® local server). In a step 770, P2P gateway 470, registers callbacks for receiving, asynchronously, the status of the delivery of messages or communication error codes. Local P2P server 538 in a step 780 returns acknowledged messages to the P2P gateway. In the step 790, the P2P gateway 470 (e.g. Skype gateway) will return, synchronously, the acknowledged message as part of a response to the notification engine 432.

Thus, a method and system to provide real-time bidding using instant messaging clients have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
an instant messaging (IM) server including at least one processor and memory including instructions to:
communicate with a market place environment via a first communication channel and to communicate with a client machine via second communication channel, the first and second communication channels using a real-time communication protocol, at least one of the first and second communication channels being a secure channel;
communicate an event notification instant message in response to detecting a predetermined event including at least a bid placed on a listing watched by a user to the client machine; and
communicate a bid to the market place environment via the secure channel.

2. The system of claim 1, wherein the market place environment further includes a commerce server to communicate with the IM server.

3. The system of claim 2, wherein the commerce server includes a notification engine module to generate the event notification and to communicate the event notification to the IM server.

4. The system of claim 2, wherein the commerce server includes an Application Program Interface (API) server module to receive the bid from the IM server.

5. The system of claim 1, wherein the bid includes a re-bid message.

6. The system of claim 1, wherein the bid includes a text message.

7. The system of claim 1, wherein the IM server includes a text parser module to parse a text message.

8. The system of claim 7, wherein the IM server further includes a bid logic module to receive the parsed text message from the text parser module and, to retrieve a bid information from the parsed text message, the bid information including a bid type, a bid value, a bidder name, and a listing from the parsed message.

9. The system of claim 1, wherein the event notification is generated by the market place environment.

10. The system of claim 1, wherein the event notification is generated in response to a detection of the predetermined event corresponding to an auction listing.

11. The system of claim 1, wherein the bid is generated by the client machine, in response to the event notification.

12. A system comprising:
a market place environment which comprises,
a website, including at least one page, to publish auction listings of a network-based commerce system;
a commerce server to host said website, and to broadcast signals to a plurality of user units and to receive signals from a plurality of said units, said signals comprising real time messages related to auction listings and auction activities related to auction listings, the auction activities including bidding, re-bidding, and out-bid alert messages;
a notification engine to communicate an event notification message, in response to detecting a predetermined event including at least a bid placed on a listing watched by a user, to a client machine;
a Peer-to-Peer (P2P) network to connect users directly to each other through a cluster of local nodes; and
a user unit to communicate real-time messages to said market place environment via said P2P network, the real-time messages including messages relating to a re-bid.

13. The system of claim 12, wherein the P2P network is to connect a P2P client to a P2P gateway via interne.

14. The system of claim 13, further comprising a P2P gateway communicatively coupled to the commerce server and the P2P network.

15. The system of claim 14, wherein the commerce system includes,
the notification engine to generate one or more real-time messages to be communicated to the P2P gateway;
an Application Program Interface (API) server to receive the one or more real-time message from the P2P gateway; and
a notification engine message queue module to queue one or more real-time messages generated by the notification engine.

16. The system of claim 14, wherein the P2P gateway includes,
a parser to parse a received message from the P2P network;
a generator to generate a real-time message to be communicated to the P2P network;
a bid logic module, the bid logic module,
to receive a parsed message from the parser and to retrieve from the parsed message a bid information including at least one of a bidder name, a bid type, a bid value, or a listing,
to communicate the retrieved bid information to the commerce server,
to receive real-time messages communicated from the commerce server,
to process real-time messages received from the commerce server, and
to communicate the processed real-time messages to the generator.

17. The system of claim 16, wherein the received message comprises at least one of a voice or text message including a re-bid message originated from a certain P2P client.

18. The system of claim 15, wherein the one or more real-time messages generated by the notification engine include outbid message alerts to be received by a P2P client.

19. The system of claim 15, wherein the one or more real-time messages generated by the notification engine include voice Extensible Markup Language (XML) alerts reading out, to a user, a listing description and a corresponding current bid price for a listing being watched by the user.

20. The system of claim 19, wherein the voice XML alerts inquire whether the user wants to place a bid for that listing.

21. A processor-implemented method comprising:
at a network-based commerce system including at least one processor and memory storing instructions, the at least one processor executing the instructions to perform the operations of:
detecting a predetermined event including at least a bid placed on a listing watched by a user;
communicating an event notification related to the detected predetermined event via a first communication channel between the network-based commerce system and a client machine of the user using a real-time communication protocol; and
accepting a bid in response to the event notification via a second communication channel between the network-based commerce system and the client machine of the user using the real-time communication protocol, the second communication channel being a secure channel.

22. The method of claim 21, wherein the real-time communication protocol comprises an Instant Messaging protocol, wherein messages between the user and the network-based commerce system are communicated via an intermediary server.

23. The method of claim 21, wherein real-time communication protocol comprises a peer-to-peer protocol, wherein messages between the user and the network-based commerce system are communicated directly without the need for any intermediary IM server.

24. The method of claim 22, wherein the communicated messages include text messages.

25. The method of claim 23, wherein the communicated messages include text messages.

26. The method of claim 23, wherein the communicated messages include voice messages.

27. The method of claim 21, wherein the first communication channel includes a secure channel.

28. The method of claim 21, wherein the event notification includes an outbid alert message.

29. The method of claim 21, wherein the bid includes a re-bid.

30. The method of claim 21, wherein the event notification includes an end of auction notice, the notice being communicated to the user, whenever the auction for a user's desired listing is closed.

31. The method of claim 30, wherein said notice further notifies the user, when a user's bid is the winning bid, and wherein said notice provides the user with further instruction to proceed with the transaction.

32. The method of claim 21, wherein the event notification include a voice XML alert reading out, to the user, a listing description and a corresponding current bid price for a listing being watched by the user.

33. The method of claim 32, wherein the voice XML alert inquires whether the user wants to place a bid for that listing.

34. The method of claim 21, wherein the predetermined event is defined by the user.

35. The method of claim 21, wherein the predetermined event includes an availability of a user's desired listing in the auction listings.

36. The method of claim 21, wherein the predetermined event includes an availability of a user's desired listing at a pre-set price in auction listings.

37. The method of claim 21, wherein the predetermined event includes a withdrawal of the pre-selected auction listing from auction listings.

* * * * *

UNITED STATES PATENT AND TRADEMARK OFFICE
CERTIFICATE OF CORRECTION

PATENT NO. : 8,589,239 B2  
APPLICATION NO. : 11/540769  
DATED : November 19, 2013  
INVENTOR(S) : Zacarias et al.

Page 1 of 1

It is certified that error appears in the above-identified patent and that said Letters Patent is hereby corrected as shown below:

In the Claims:

In column 11, line 17, in Claim 12, delete "comprises," and insert --comprises:--, therefor In column 11, line 38, in Claim 13, delete "interne." and insert --internet.--, therefor In column 11, line 43, in Claim 15, delete "includes," and insert --includes:--, therefor In column 11, line 56, in Claim 16, after "network;", insert --and--, therefor In column 11, line 57, in Claim 16, after "module,", delete "the bid logic module,", therefor Signed and Sealed this
Sixth Day of May, 2014

Michelle K. Lee
*Deputy Director of the United States Patent and Trademark Office*